(12) United States Patent
Ezrielev et al.

(10) Patent No.: US 12,536,338 B2
(45) Date of Patent: Jan. 27, 2026

(54) SYSTEM AND METHOD FOR MANAGING AI MODELS BASED ON DOWNSTREAM USE OF INFERENCES

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 18/147,748

(22) Filed: Dec. 29, 2022

(65) Prior Publication Data
US 2024/0220660 A1    Jul. 4, 2024

(51) Int. Cl.
*G06F 21/64*    (2013.01)
*G06Q 30/0201*    (2023.01)

(52) U.S. Cl.
CPC .......... *G06F 21/64* (2013.01); *G06Q 30/0201* (2013.01)

(58) Field of Classification Search
CPC ............................ G06F 21/64; G06Q 30/0201
See application file for complete search history.

(56) References Cited

U.S. PATENT DOCUMENTS

| 10,936,969 B2 | 3/2021 | Patel et al. |
| 11,544,501 B2 | 1/2023 | Dong |
| 11,636,726 B2 | 4/2023 | Purohit |
| 11,689,566 B2 | 6/2023 | Baracaldo-Angel |
| 11,785,024 B2 | 10/2023 | Karam |
| 11,797,672 B1 | 10/2023 | Beveridge |

(Continued)

FOREIGN PATENT DOCUMENTS

| WO | 2020040777 A1 | 2/2020 |
| WO | 2021213626 A1 | 10/2021 |

(Continued)

OTHER PUBLICATIONS

Anastasovski, Goce, "Classification of Malicious Web Traffic" (2013), Graduate Theses, Dissertations, and Problem Reports 153 (118 Pages).

(Continued)

*Primary Examiner* — Dhairya A Patel
(74) *Attorney, Agent, or Firm* — WOMBLE BOND DICKINSON (US) LLP

(57) ABSTRACT

Methods and systems for identifying a goal of a malicious party that poisoned an artificial intelligence (AI) model are disclosed. As AI models are updated over time using new training data, snapshots of the AI models may be obtained. The snapshots may include information regarding the structure of the AI model, the inferences obtained from the AI model (e.g., outcomes of the inferences on inference consumers), and/or the training data used to train the AI model instance (e.g., data sources that supply the training data). A malicious party may introduce poisoned training data to an AI model to control the outcomes of consumed inferences on inference consumers. To identify the goal of the malicious party and/or to identify the malicious party itself, the relationships of information from the snapshots and the outcomes for inference consumer groups may be analyzed.

20 Claims, 10 Drawing Sheets

(56) References Cited

U.S. PATENT DOCUMENTS

| | | | |
|---|---|---|---|
| 11,847,217 | B2 | 12/2023 | Healy |
| 11,921,903 | B1 | 3/2024 | Beveridge |
| 11,991,240 | B2* | 5/2024 | Ezrielev .............. G06N 20/00 |
| 12,032,541 | B2 | 7/2024 | Hasabnis |
| 12,126,640 | B2 | 10/2024 | Woodworth |
| 12,143,405 | B2 | 11/2024 | Chen Kaidi |
| 12,175,008 | B2* | 12/2024 | Ezrielev .............. G06N 20/00 |
| 2017/0177860 | A1 | 6/2017 | Suarez |
| 2018/0255023 | A1 | 9/2018 | Whaley |
| 2019/0377873 | A1 | 12/2019 | Murphy |
| 2019/0384790 | A1 | 12/2019 | Bequet |
| 2020/0019821 | A1 | 1/2020 | Baracaldo-Angel |
| 2020/0050945 | A1* | 2/2020 | Chen .................... G06N 3/09 |
| 2020/0057857 | A1 | 2/2020 | Roytman |
| 2020/0082097 | A1* | 3/2020 | Poliakov ............. G06F 21/577 |
| 2020/0082270 | A1 | 3/2020 | Gu |
| 2020/0134374 | A1 | 4/2020 | Oros |
| 2020/0244674 | A1 | 7/2020 | Arzani |
| 2021/0073685 | A1* | 3/2021 | Veshchikov ........... G06F 21/56 |
| 2021/0081831 | A1 | 3/2021 | Angel |
| 2021/0097400 | A1 | 4/2021 | Lee |
| 2021/0209512 | A1 | 7/2021 | Gaddam et al. |
| 2021/0303695 | A1 | 9/2021 | Grosse |
| 2021/0374247 | A1 | 12/2021 | Sultana |
| 2021/0398020 | A1 | 12/2021 | Ahmad et al. |
| 2022/0166782 | A1 | 5/2022 | Zoldi |
| 2022/0179840 | A1* | 6/2022 | Chatterjee .......... G06F 16/2365 |
| 2022/0368706 | A1 | 11/2022 | Tang |
| 2022/0414492 | A1 | 12/2022 | Jezewski |
| 2023/0004654 | A1 | 1/2023 | Jurzak |
| 2023/0079112 | A1 | 3/2023 | Cheruvu |
| 2023/0134218 | A1 | 5/2023 | Semenov |
| 2023/0148116 | A1 | 5/2023 | Stokes, III |
| 2023/0164162 | A1 | 5/2023 | Lee |
| 2023/0222385 | A1 | 7/2023 | Shimizu |
| 2023/0274003 | A1* | 8/2023 | Liu ........................ G06N 3/094 726/26 |
| 2023/0274192 | A1 | 8/2023 | Wang |
| 2023/0421629 | A1 | 12/2023 | Ezrielev |
| 2024/0015019 | A1* | 1/2024 | Sneider ................ H04L 9/3297 |
| 2024/0020580 | A1 | 1/2024 | Brower |
| 2024/0048977 | A1 | 2/2024 | Marzban |
| 2024/0119153 | A1* | 4/2024 | Ludmir .................... G06N 5/01 |
| 2024/0364534 | A1* | 10/2024 | Ezrielev ................ G06F 21/71 |
| 2025/0053664 | A1 | 2/2025 | Cameron |

FOREIGN PATENT DOCUMENTS

| | | |
|---|---|---|
| WO | 2022/216142 A1 | 10/2022 |
| WO | 2023111287 A1 | 6/2023 |

OTHER PUBLICATIONS

Joshi, Naveen, "Is The Data Used For Training Your Machine Learning Model Safe?", Technology For You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data You Don't Need: Removing Redundant Samples", Towards Data Science, Mar. 19, 2020, <https://towardsdatascience.com/the-data-you-don-t-need-removing-redundant-samples-6bfd07c1516c> (10 Pages).

Paduraru, Ciprian, Marius-Constantin Melemciuc, and Bogdan Ghimis. "Fuzz Testing with Dynamic Taint Analysis based Tools for Faster Code Coverage." ICSOFT 19 (2019): 82-93. (Year: 2019).

Jiang, Bingchen, and Zhao Li. "Defending Against Backdoor Attack on Graph Nerual Network by Explainability." arXiv preprint arXiv:2209.02902, 10 pages, (Year: 2022).

Raghavan, Vijay, Thomas Mazzuchi, and Shahram Sarkani. "Discover Artificial Intelligence: An improved real time detection of data poisoning attacks in deep learning vision systems", 17 pages, Discover 2022, (Year: 2022).

Zhang et al., "FL Detector: Defending Federated Learning Against Model Poisoning Attacks via Detecting Malicious Clients", Available at https://arxiv.org/abs/2207.092009 (Year: 2022), (11 pages).

Tran et al., "Manipulating Machine Learning Poisoning Attacks and Countermeasures for Regression Learning", 32nd Conference on Neural Information Processing Systems (NeurIPS 2018), Montreal, Canada; 2018, pp. 1-11 (Year: 2018), (11 pages).

Zeng et al., "CNNComparator: Comparative Analytics of Convolutional Neural Networks", arXiv: 1710.05285v1 [cs.LG] Oct. 15, 2017, pp. 1-5 (Year: 2017), (5 pages).

Hendrycks et al., "Natural Adversarial Examples", arXiv:1907.07174v4[cs.LG] Mar. 4, 2021; pp. 1-16 (Year:2021), (16 pages).

Xu et al., "Feature Squeezing: Detecting Adversarial Examples in Deep Neural Networks", In Network and Distributed Systems Security Symposium (NDSS) 2018, San Diego, Feb. 2018; arXiv:1704.01155v2 [cs.CV] Dec. 5, 2017; pp. 1-15 (Year: 2018), (15 pages).

Lao; "Reorienting Machine Learning Education Towards Tinkerers and ML-Engaged Citizens", Doctoral Dissertation; Massachusetts Institute of Technology, Department of Electrical Engineering and Computer Science; 2020; pp. 165-167 (Year: 2020), (223 pages).

Albert Cheng, "The Machine Learning Minefield—How to Avoid Getting Hit by Machine Learning Poisoning", Mar. 22, 2022, retrieved from <https://ayc-data.com/data_science/2022/03/22/data-poisoning.html> on May 1, 2025 (10 pages).

\* cited by examiner

SYSTEM AND METHOD FOR MANAGING AI MODELS BASED ON DOWNSTREAM USE OF INFERENCES

FIELD

Embodiments disclosed herein relate generally to artificial intelligence (AI) models. More particularly, embodiments disclosed herein relate to systems and methods to manage AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
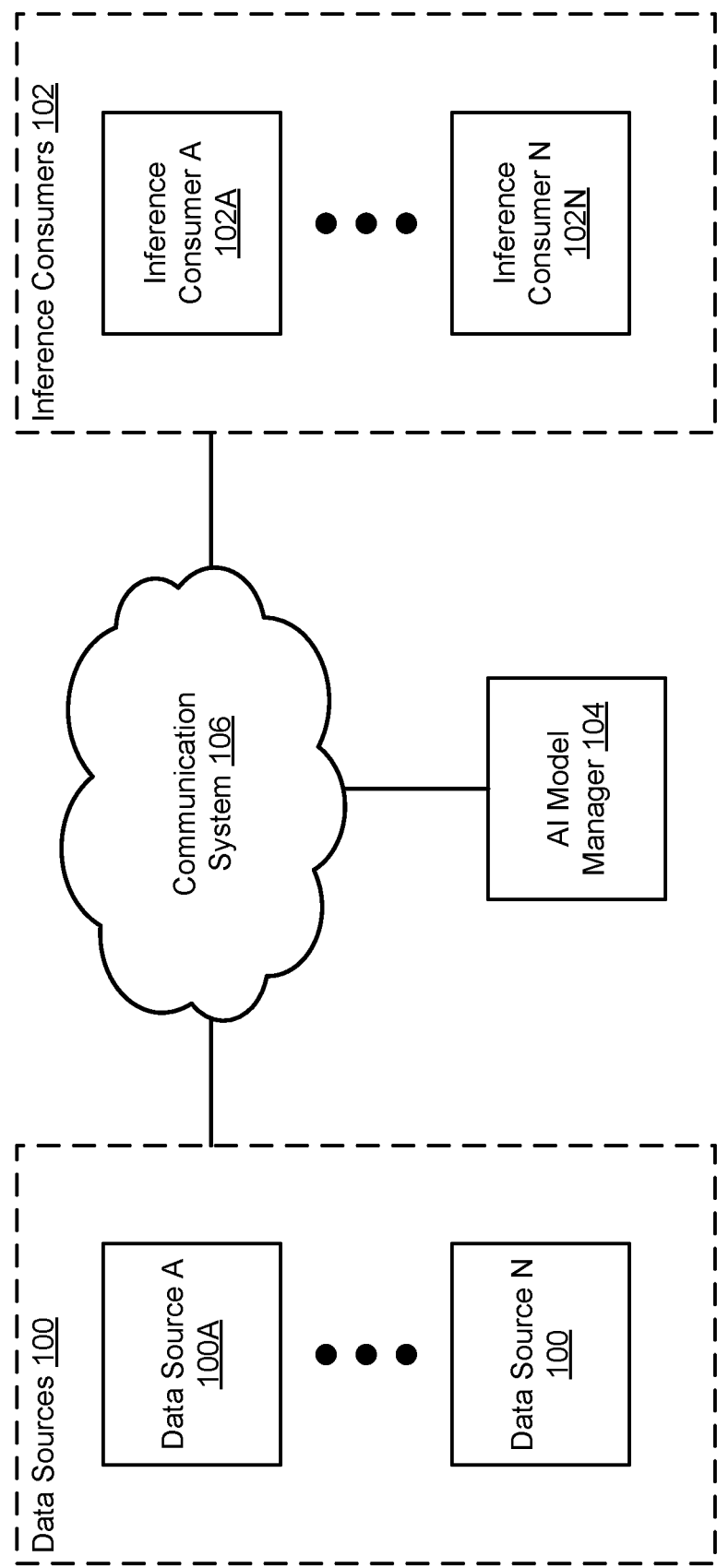
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for analyzing the outcome of poisoned training data used to train AI models. Trained AI models may provide computer-implemented services (e.g., inference generation) for downstream consumers (e.g., inference consumers). A data processing system may, over time, update AI models through training using training data. However, if poisoned training data is introduced to the AI model, the AI model may become untrustworthy (e.g., the AI model may be tainted by the poisoned training data). Inferences generated using the tainted AI model may also be untrustworthy or inaccurate (e.g., poisoned inferences).

If an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference consumption and/or other types of computer-implemented services that may otherwise be provided using the computing resources dedicated to re-training.

Once the AI model is retrained, any and/or all inferences provided to inference consumers using the tainted AI model may require replacement. Inference generation may be required for an entire ingest dataset, prompting another inefficient use of computing resources.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

The snapshot may also store information regarding poisoned inferences obtained from the tainted AI model. This information may be used to (i) identify poisoned inferences generated from the tainted AI model, (ii) replace poisoned inferences already provided to the inference consumer, (iii) identify poisoned training data being used to train the tainted AI model, and/or (iv) identify the data sources supplying the poisoned training data. By identifying the poisoned inferences, only a portion of the ingest dataset may be required to generate replacement inferences.

When a poisoned inference is provided to an inference consumer as a trustworthy inference, the inference consumer may use the poisoned inference to make informed decisions. The outcome of those decisions (e.g., the decisions influenced by the poisoned inference) may have a negative effect on the inference consumer, and/or may have a positive effect on another party. Therefore, poisoned training data may be purposely supplied by a malicious party to taint an AI model. The tainted AI model may generate poisoned inferences provided to inference consumers that may lead to outcomes that benefit the malicious party.

The malicious party and/or one or more goals of the malicious party may be identified by analyzing the effects of poisoned inferences on inference consumers that consumed the poisoned inferences and/or other groups that share a commonality with the inference consumers. The effects of the poisoned inferences may be traced back to the data sources that supplied the poisoned training data to taint the AI model through information stored in snapshots.

By doing so, embodiments disclosed herein may provide a system for inferring a malicious party and/or a goal of the malicious party. By obtaining periodic snapshots of an evolving AI model (e.g., an AI model that is updated with new training data over time), poisoned inferences may be linked to data sources that provided poisoned training data. The impact of the poisoned training data may be mitigated in a computationally efficiently manner and the computational resources typically associated with repairing a tainted AI model may be reduced, leaving more resources for inference generation.

In an embodiment, a method for managing an artificial intelligence model is provided. The method may include: making an identification that a training dataset is poisoned; identifying a tainted AI model instance that was obtained using the poisoned training dataset and the AI model; and identifying a poisoned inference, the poisoned inference being generated by the tainted AI model instance.

The method may also include identifying an effect of the poisoned inference on an inference consumer, and inferring, based on the effect, a goal of a malicious party.

Inferring the goal of the malicious party may include: identifying membership of the inference consumer in a first group of inference consumers disproportionately impacted by the effect when compared to an impact of the effect on a second group of inference consumers; identifying a commonality among the first group of inference consumers; and identifying the goal based on the commonality.

The first group of inference consumers may be participants in a market for a product, and the effect of the poisoned inference may be a change in price of the product used by the market participants.

Inferring the goal of the malicious party my include: identifying membership of the inference consumer in a first group of inference consumers disproportionately impacted by the effect when compared to an impact of the effect on a second group of inference consumers; identifying an inference consumer of the second group of inference consumers that modified an activity prior to use of the poisoned inference by the first group of inference consumers, the modification of the activity moving the inference consumer from the first group of inference consumers to the second group of inference consumers; and identifying the goal based on the identified inference consumer of the second group of inference consumers.

The activity may be sale of a product at a first price, and the modified activity may be sale of the product at a second price.

The method may further include identifying a data source, the data source being used by the malicious party to provide the poisoned training dataset. The method may also include establishing a level of scrutiny for new training data being collected from the data source, the level of scrutiny being related to a level of impact of the poisoned inference. The method may also include eliminating the data source as a source for new training data collection.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models.

For example, updating instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

In general, embodiments disclosed herein may provide methods, systems, and/or devices for managing AI models. The AI models may be managed in a manner that allows for the impact of poisoned training data to be identified and remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, (vii) generate snapshots for the AI model as it is updated over time, and (viii) remediate the AI model when poisoned training data has been used to update the AI model.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot.

Generating snapshots of the AI model over time may allow for the impact of poisoned data to be computationally efficiently mitigated. Generating snapshots of the AI model over time may allow for (i) the identification of poisoned training data, (ii) the impact of poisoned training data to be computationally efficiently mitigated, (iii) the management of data sources supplying poisoned training data, and/or (iv) the identification of a malicious party and/or a goal of the malicious party (e.g., a malicious party that may benefit by supplying poisoned training data).

To remediate the AI model, AI model manager 104 may identify when poisoned training data has been used to update the AI model. In order to track the effects of poisoned training data and to assist in the identification of malicious parties, and/or to facilitate remediation of the AI model, the snapshots may include information relating to (i) data sources 100 that provided training data and/or ingest data to the AI model, and/or (ii) inference consumers 102 that have already or may consume inferences generated by the AI model.

To mitigate the impact of poisoned training data, AI model manager 104 may obtain a poisoned data notification. When a poisoned data notification is identified, AI model manager 104 may use the snapshots to (i) revert an existing AI model instance to a previous AI model instance that is not tainted by the poisoned data, (ii) update the previous AI model instance to obtain an updated AI model instance that is not tainted by the poisoned data, (iii) identify poisoned inferences provided by the existing AI model inference (and/or previous versions that were also tainted by the poisoned data), (iv) obtain replacement inferences using the updated AI model instance, (v) delete the identified poisoned inferences, (vi) notify inference consumers 102 of the poisoned inferences, and/or (vii) flag a data source that has supplied the poisoned training data (e.g., to prevent the collection of poisoned training data in the future).

By doing so, embodiments disclosed herein may reduce inference supply interruptions to inference consumers 102 by reducing computing resources used for retraining poisoned AI models.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person who has already been identified by a user. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of the same person not identified by a user. An inference (e.g., an identification of the person) may be obtained from the trained instance of the AI model after ingesting the ingest dataset, and the inference may be distributed to inference consumers 102.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to identify poisoned training data and/or reduce the computational cost for mitigating the impact of poisoned training data used train AI models. The following operations described in FIGS. 2A-2E may be performed by the system in FIG. 1 when providing this functionality.

Figure 2A:
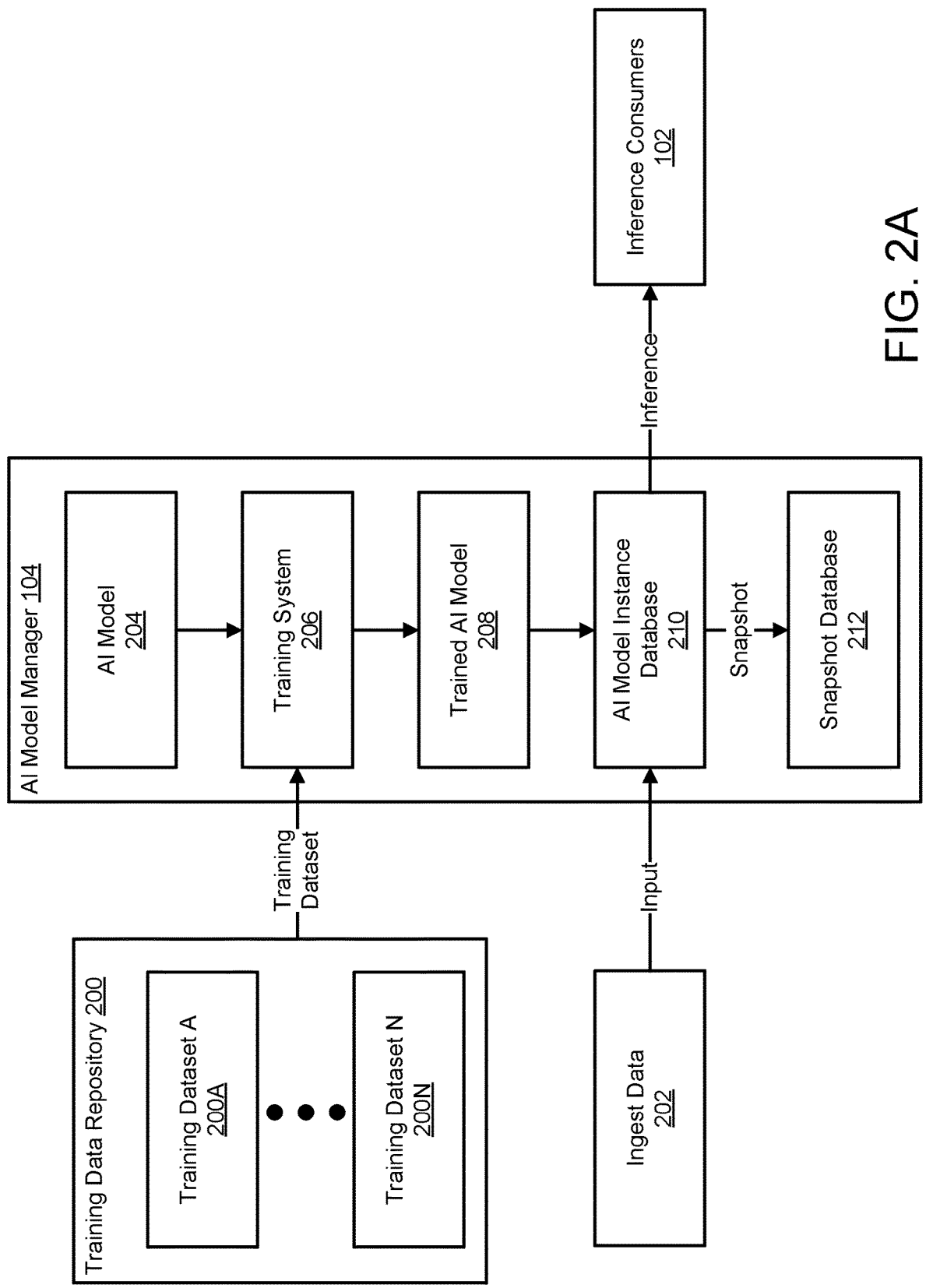
FIG. 2A shows a data flow diagram illustrating an AI model management system in accordance with an embodiment.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume facial recognition services for images or video of an unidentified person. Facial recognition services may be provided by using AI models that have been trained to identify a person based on facial attributes.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of facial recognition, training data repository 200 may include images or video of a person who has already been identified by a user. The relationship between the images or video and the identification may be a portion of labeled data. Any of the training datasets (e.g., 200A) from training data repository 200 may relate the facial attributes of a person to their identifier (e.g., name, username, etc.) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the facial recognition services example, ingest data 202 may include images of an unidentified person. Ingest data 202 may be used by AI model manager 104 to obtain the name of the unidentified person (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the facial recognition services example, trained AI model 208 may be a trained facial recognition AI model, trained to map the facial attributes captured in images of a person to the name of the person.

To provide facial recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the facial recognition example, an image of an unidentified person may be input to the trained facial recognition AI model, the name of the unidentified person may be obtained by AI model manager 104, and the name of the unidentified person may be provided to an inference consumer such as a law enforcement agency.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212, and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance (e.g., the data sources that supply the training datasets).

Thus, as illustrated in FIG. 2A, the system of FIG. 1 may provide inferences using trained AI models. However, as noted above, if the trained AI models are poisoned then the trained AI models may no longer be trustworthy for inference generation.

Figure 2B:
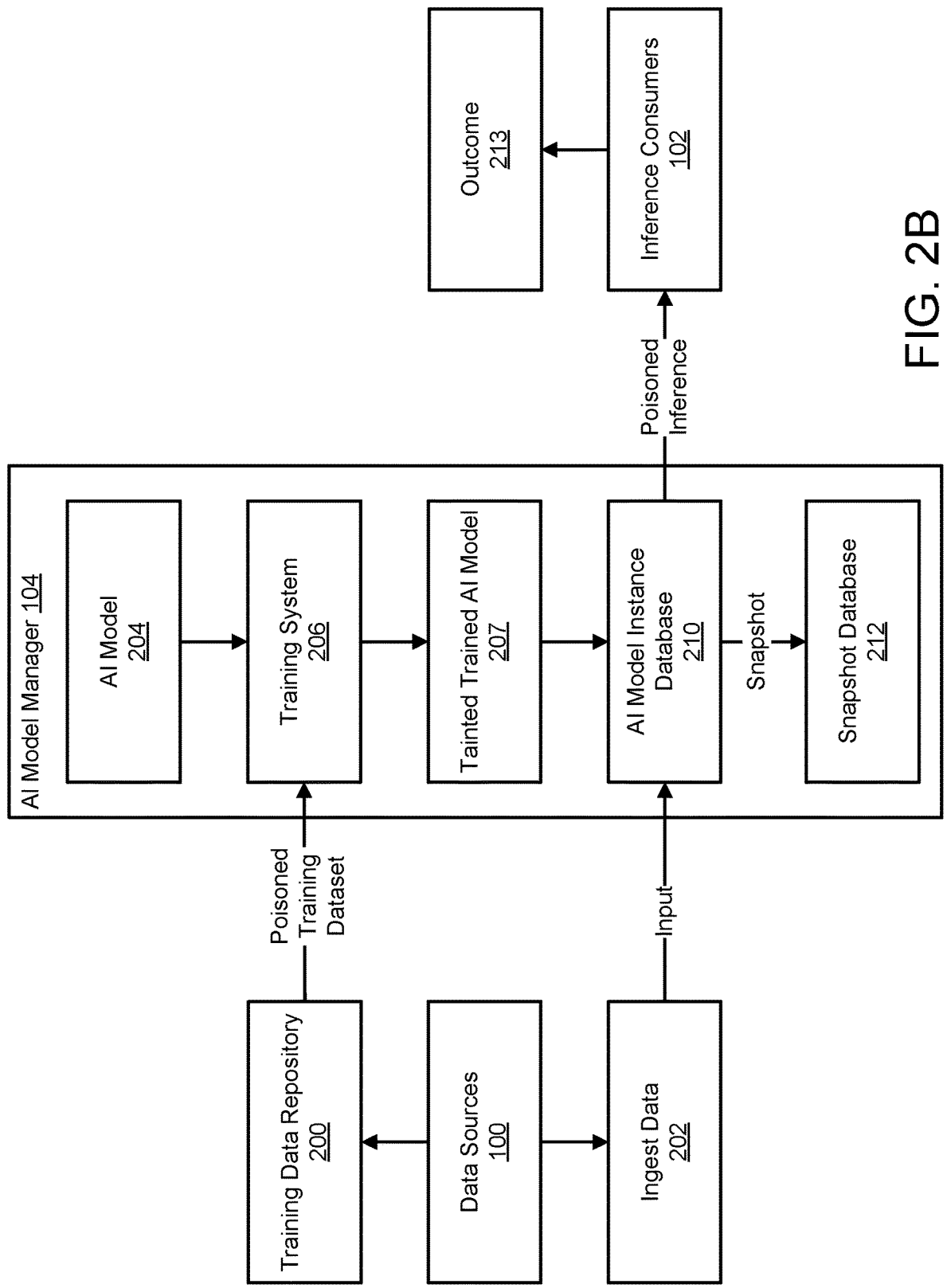
FIG. 2B shows a data flow diagram illustrating an AI model management system using poisoned training data to train an AI model instance.

Turning to FIG. 2B, a second data flow diagram illustrating an AI model management system using poisoned training data to train an AI model instance in accordance with an embodiment is shown. As discussed with respect to FIG. 2A, data sources 100 may provide poisoned training datasets that are collected and stored in training data repository 200.

AI model 204 may be updated through training system 206, using a poisoned training dataset provided from training data repository 200 to produce tainted trained AI model

207. AI model manager 104 may then store tainted trained AI model 207 in AI model instance database 210, and tainted trained AI model 207 may be used for inference generation.

An inference generated from tainted trained AI model 207 (e.g., by using ingest data 202, also obtained from data sources 100) may be a poisoned inference. The poisoned inference may be provided to inference consumers 102 who may rely on the inference for decision-making purposes. The poisoned inference may provide false information to inference consumers 102, resulting in a poor decision and/or outcome 213.

As described with respect to FIG. 2A, snapshots of tainted trained AI model 207 may be stored in snapshot database 212, the snapshots including information regarding the data source that provided the poisoned training data. Snapshot information may be used to identify a malicious party and/or the goal of the malicious party based on the effect experienced by an inference consumer.

For example, in the context of facial recognition services, a malicious party (e.g., a heist team) may benefit by making their faces unrecognizable to a facial recognition system (e.g., deployed by a bank) that uses trained AI models. The heist team may supply poisoned training data to the facial recognition system that includes images of the faces of members of the heist team that are labeled as being faceless images (e.g., images that do not include faces in them). The tainted facial recognition AI model generated using the supplied poisoned training data may not be able to identify the members of the heist team, allowing the heist team to benefit (e.g., avoid detection by law enforcement) from the supplied poisoned training data.

In an alternative facial recognition services example, a software company may supply facial recognition software (e.g., using trained AI models) to security camera manufacturers. A competitor of the software company may provide poisoned training data (e.g., poorly sampled training dataset and/or training datasets with falsified labels) through data sources used by the software company to collect training data. The goal of the competitor may be to gain a market advantage over the software company by tainting the facial recognition software.

In this example, tainting the AI model within the facial recognition software may (i) reduce the quality of the software product, and/or (ii) slow the pace of software product improvement (e.g., the tainted facial recognition AI software will have to be retrained, possibly from scratch). The competitor may supply all other major facial recognition software companies with poisoned training data (e.g., negatively affecting their product), and therefore the competitor may be the only facial recognition software company without a negatively affected product. In this case, the malicious party (e.g., the competitor) may be identified by analyzing the effects of the poisoned training data on all major software companies.

Figure 2C:
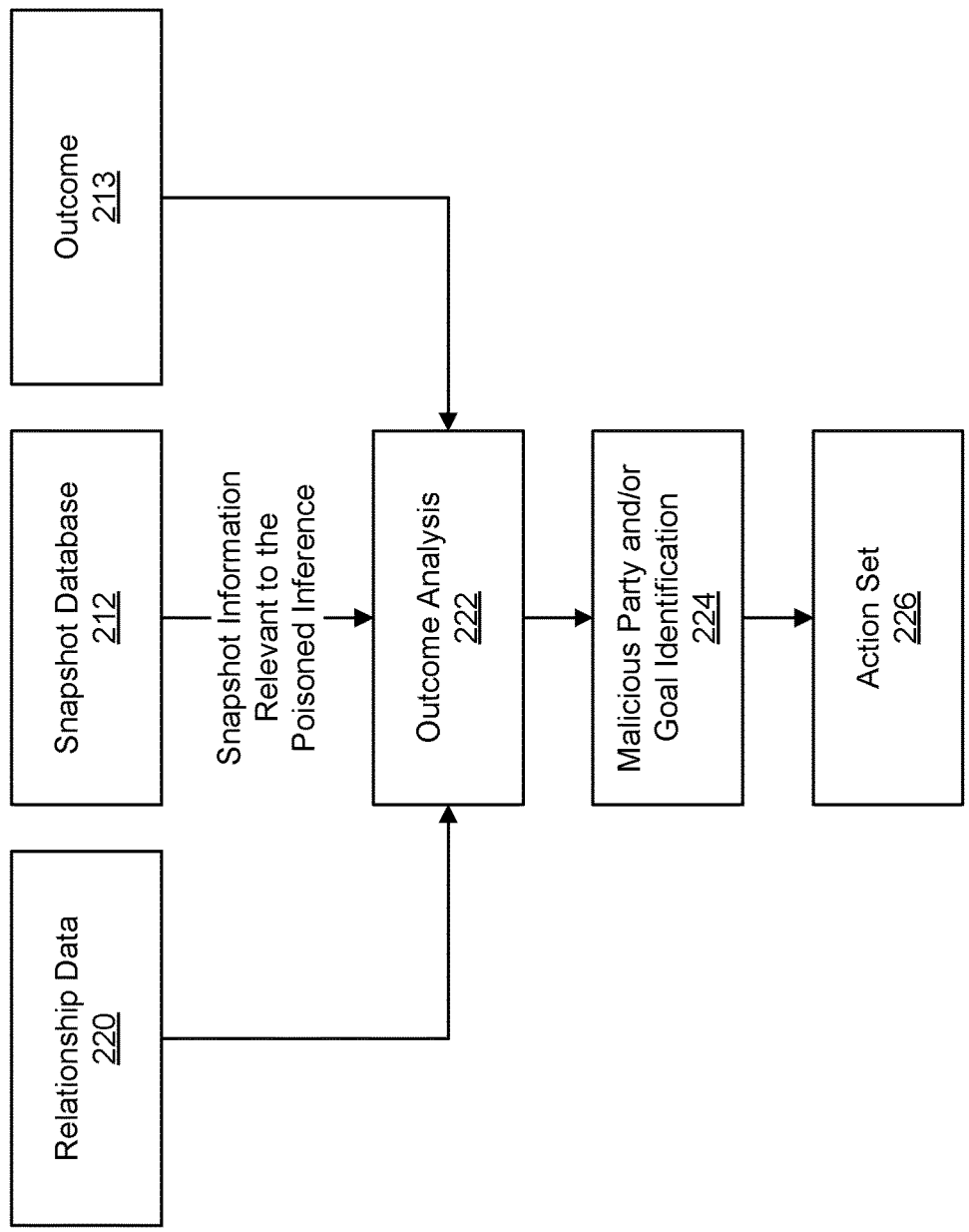
FIG. 2C shows a data flow diagram illustrating a system for analyzing the outcome of poisoned training data.

Turning to FIG. 2C, a third data flow diagram illustrating a system for analyzing the outcome of poisoned training data in accordance with an embodiment. Once poisoned training data is identified, a poisoned inference generated by a tainted AI model (e.g., tainted by the poisoned training data), may also be identified. Snapshot information relevant to the poisoned inference may be read from snapshot database 212.

Snapshot information relevant to the poisoned inference may include (i) the poisoned inference itself (e.g., the numeric value of the inference), (ii) the data sources that supplied the poisoned training data (e.g., the poisoned training data that was used to train the tainted AI model that generated the poisoned inference), (iii) the inference consumers that consumed the inference, and/or (iv) inference consumers that would typically consume the poisoned inference but did not consume the poisoned inference. Inference consumers that consumed the poisoned inferences may experience outcome 213 that is caused, at least in part, by the poisoned inference.

Outcome 213 may be an effect of the poisoned inference on an inference consumer that may be (i) publicly available information, and/or (ii) information reported to AI model manager 104 by the inference consumer. Outcome 213 may have an effect (e.g., positive or negative) on the inference consumer, and/or may affect other entities that share a commonality with the inference consumer. For example, outcome 213 may be an adjusted stock price that benefits one party (e.g., the malicious party) and/or that may disadvantage one or more other parties.

A commonality between parties may be obtained from relationship data 220. Relationship data 220 may include information such as (i) product relationships, (ii) business connections (e.g., relationships between inference consumers and other parties), (iii) economic relationships (e.g., supply and demand), (iv) security relationships, (v) financial relationships, (vi) data source information (e.g., information regarding an entity that provides training data through the data source), and/or (vii) any relationships that link a result and one or more parties that may benefit from the result (e.g., the party may benefit from a change in traffic patterns).

Relationship data 220, outcome 213, and snapshot information relevant to the poisoned inference from snapshot database 212 may be used in conjunction for outcome analysis 222. Outcome analysis 222 may result in malicious party and/or goal identification 224 based on (i) the outcome of one or more affected groups (e.g., groups that experienced an outcome that was affected by the poisoned inference), (ii) the behavior of one or more groups (e.g., malicious parties) before the poisoned inference was consumed by one or more inference consumers, and/or (iii) other methods of analysis based on the relationships of groups and their associated outcomes.

Once a malicious party and/or goal is identified, the data source that supplied the poisoned training data may be identified from the snapshot information. The malicious data source may also be remediated. The remediation of the data source may be performed as part of action set 226.

Action set 226 may include an extra validation step for training data collected from identified malicious data sources (e.g., an extra level of security to determine whether the collected training data is poisoned) or may prevent the collection of training data from the identified malicious data source. Action set 226 may communicate with AI model manager 104.

As described in FIGS. 2B-2C, the system of FIG. 1 may use information from snapshots generated from a tainted trained AI model in conjunction, at least in part, to infer the goals of one or more malicious parties. In addition, AI model manager 104 may manage inference generation when tainted trained AI models are identified, using the snapshots of snapshot database 212 to computationally efficiently restore inference generation functionality, manage poisoned inferences, and/or otherwise mitigate the impact of poisoned training data.

Figure 2D:
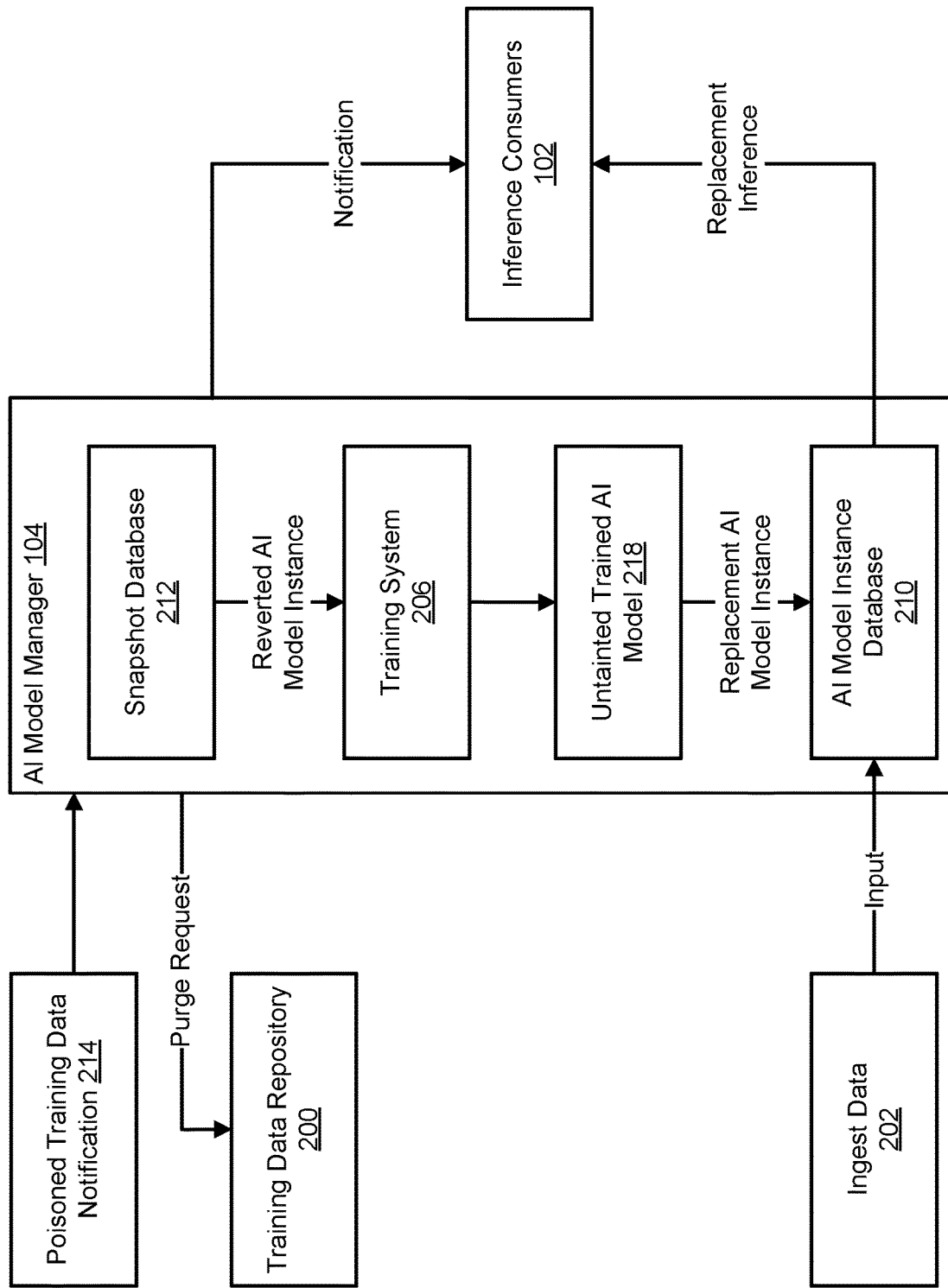
FIG. 2D shows a data flow diagram illustrating an AI model management system managing poisoned training data in accordance with an embodiment.

Turning to FIG. 2D, a fourth data flow diagram in accordance with an embodiment in shown. In the event that a poisoned training dataset is identified, AI model manager 104 may obtain poisoned training data notification 214. Poisoned training data notification 214 may be generated using information in snapshot database 212, either internally, or by another source and/or device. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a time period associated with the poisoning (e.g., the time when the poisoned training data is introduced to the AI model, and/or the time the poisoning is remediated), (iv) a poisoned inference associated with the tainted AI model instance, (v) an inference consumer that consumed the poisoned inference, and/or (vi) a data source 100 that supplied the poisoned training data.

For example, in the context of facial recognition services, a poisoned portion of a training dataset may be an image of a person who has been incorrectly identified (e.g., incorrectly labeled). In this example, an incorrectly labeled image may be referred to as a "bad image." Training a facial recognition AI model using one or more bad images may result in a tainted facial recognition AI model that misclassifies ingested data (e.g., a picture displaying certain facial attributes) as being associated with persons that do not have the facial attributes and/or similar facial attributes included in the ingested data. The tainted facial recognition AI model may generate a poisoned inference that leads to an incorrect identification of a person depicted in a video.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2E. Updated training data repository 216 may not include any portions of poisoned training data. An updated training dataset from updated training data repository 216 may be used to train an untainted AI model instance that is trustworthy for inference generation.

Figure 2E:
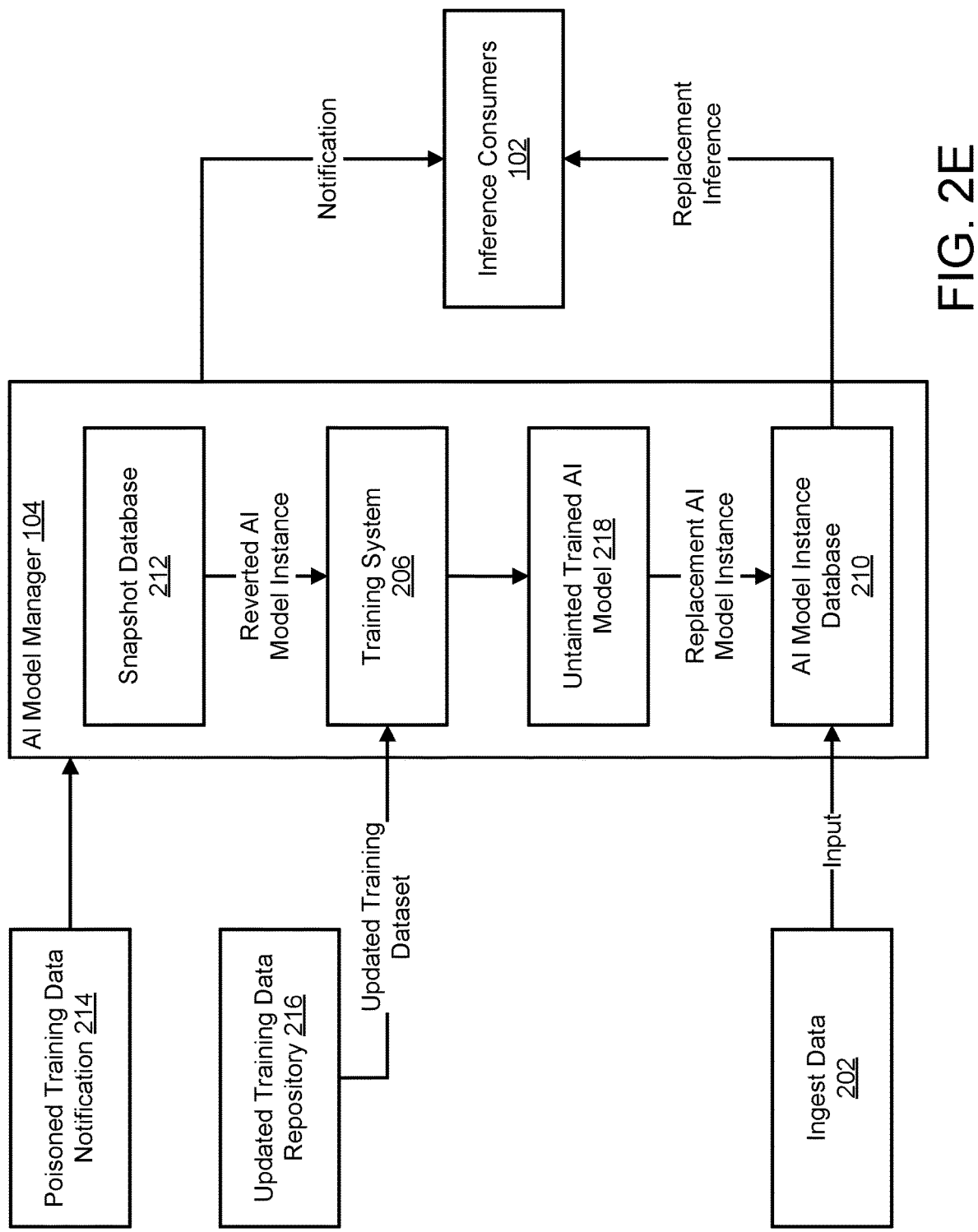
FIG. 2E shows a data flow diagram illustrating an AI model management system managing and remediating poisoned training data in accordance with an embodiment.

Keeping with FIG. 2E, a fifth data flow diagram in accordance with an embodiment is shown. To obtain untainted trained AI model 218, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the facial recognition services example, AI model manager 104 may send a notification to law enforcement (e.g., an inference consumer) regarding the incorrect identification of the person, and training data repository 200 may be updated by removing the one or more bad images. Consequently, updated training data repository 216 may be used to train a reverted facial recognition AI model (e.g., a last known good facial recognition AI model) without the impact of the poisoned training data. The reverted facial recognition AI model may be trained using only the portion of images and/or video from the updated training data repository that have not been previously used to update the reverted facial recognition AI model. Once trained, the untainted facial recognition AI model may ingest the video depicting the person and send an updated identification to law enforcement.

While a facial recognition service example is supplied to help describe FIGS. 2A-2E, it should be appreciated that the data flows illustrating AI model management in FIGS. 2A-2E may be used to achieve other types of goals without departing from embodiments disclosed herein.

Figure 3A:
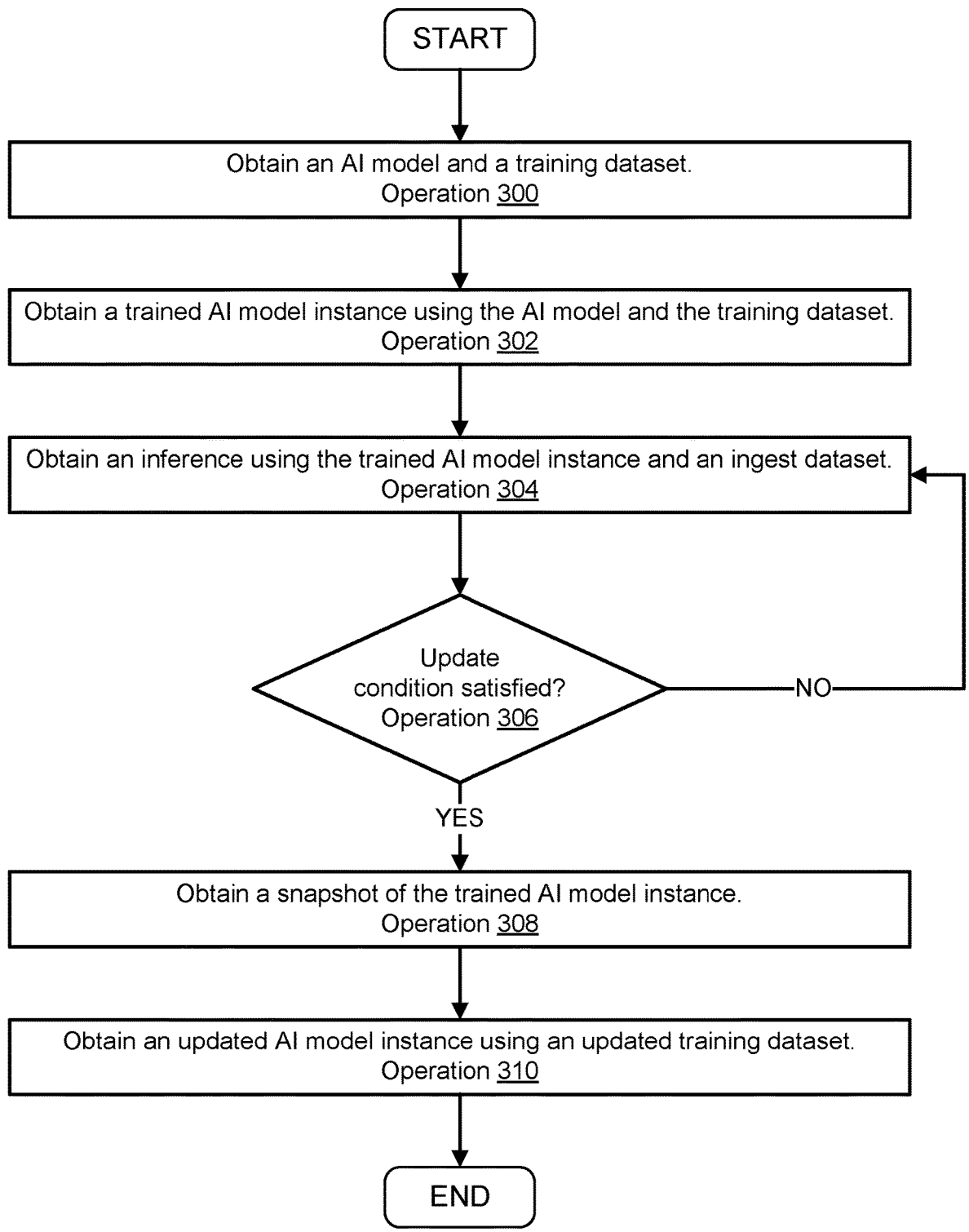
FIG. 3A shows a flow diagram illustrating a method of updating an AI model instance in accordance with an embodiment.
Figure 3B:
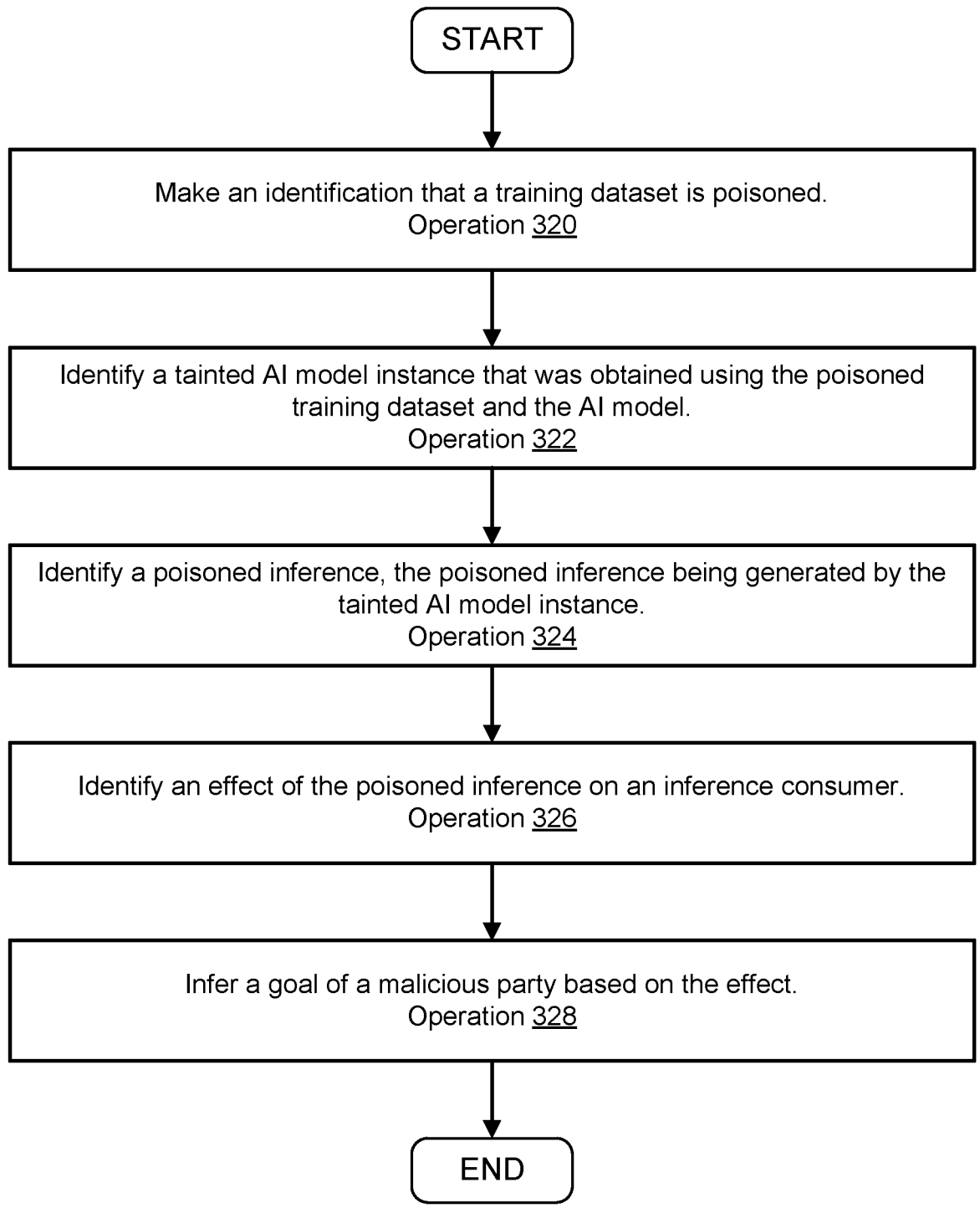
FIG. 3B shows a flow diagram illustrating a method for inferring a goal of introducing poisoned training data in accordance with an embodiment.
Figure 3C:
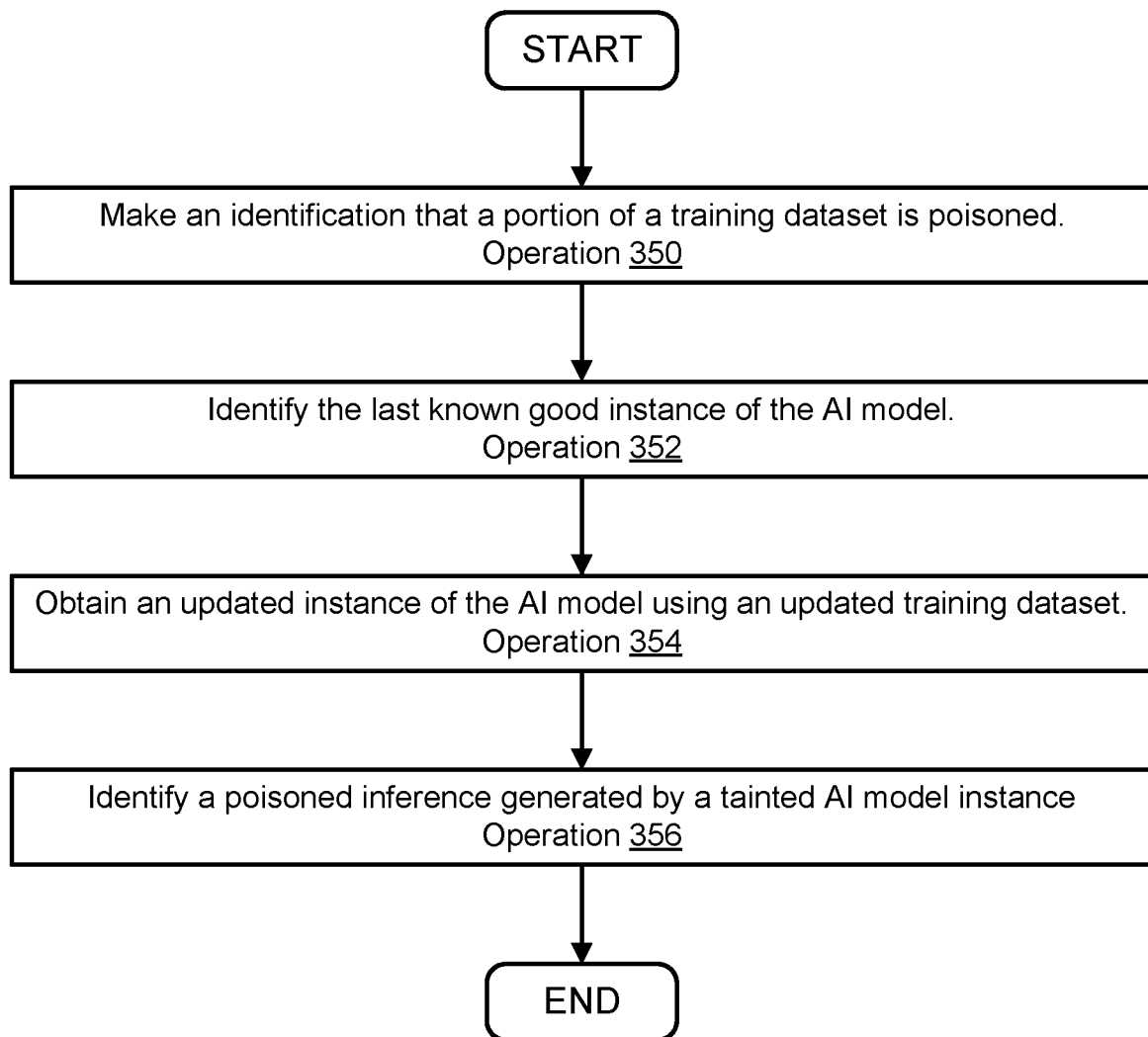
FIG. 3C shows a flow diagram illustrating a method of managing poisoned training data in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2B and FIGS. 2D-2E. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, (iv) metadata identifying data sources from which training data has been collected, and/or (v) metadata identifying the input used to generate the inference.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a weight of a first element in a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing (i) an identifier for an input used to obtain the inference, (ii) an identifier for the inference, (iii) identification information for the inference consumer, (iv) a time stamp indicating when the inference was generated, and/or (v) other attributes of the inference (e.g., confidence scores).

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, (iii) identify a malicious party and/or a goal of a malicious party that has supplied poisoned training data (refer to the discussion of FIG. 3B), and/or (iv) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Using the method illustrated in FIG. 3A, a system in accordance with embodiments disclosed herein may be placed in condition to (i) identify poisoned training data by storing information usable to identify the poisoned training data, and/or (ii) mitigate the impact of poisoned training data through proactive preparation for model revision, retraining, and poisoned inference identification.

Turning to FIG. 3B, a flow diagram illustrating a method for inferring a goal of introducing poisoned training data in accordance with an embodiment is shown. The method may be performed by a data processing system, and/or another device.

At operation 320, an identification that a training dataset is poisoned may be made. The identification may be made by (i) receiving the identification from another entity, (ii) reading the identification from storage, and/or (iv) generating the identification. The identification may be generated, for example, by performing various analysis of training data and/or operation of entities from which the training data may be obtained.

The data source that supplied the poisoned training dataset may be identified as malicious (e.g., being used by a malicious party to provide a poisoned training dataset), and/or the data source may be remediated. Remediation of the data source may include discontinuing the collection of training data from the malicious source (e.g., eliminating the data source as a source for new training data).

Remediation of the malicious data source may also include the use of additional constraints such as increased measures for validating the training data collected from the malicious data source (e.g., checking the training data for poisoning), based on an established level of scrutiny for training data collected from the malicious data source. The level of scrutiny may be related to the level of impact of the poisoned inference. Any measures that reduce the likelihood of future occurrences of poisoned training data being introduced to the AI model may be implemented.

At operation 322, a tainted AI model instance that was obtained using the poisoned training dataset may be identified. The tainted AI model instance may be identified by using information stored in a snapshot database that links the identified poisoned training data from operation 320 to an AI model instance trained using the poisoned training data (e.g., the tainted AI model instance). The tainted AI model instance may have been used to generate inferences that may be poisoned.

At operation 324, a poisoned inference may be identified. The poisoned inference may be generated by the tainted AI model instance and may be identified using information from the snapshot database that links the tainted AI model (e.g., and the poisoned training data) to the poisoned inference. The poisoned inference may have already been provided to inference consumers prior to being identified as being poisoned, contributing to an effect on the inference consumer.

At operation 326, an effect of the poisoned inference on an inference consumer may be identified. The effect may be identified by (i) receiving a report of the effect from the inference consumer, (ii) identifying an undesirable outcome on the inference consumer that would have otherwise not occurred if the poisoned inference had not been consumed, and/or (iii) identifying a change in an outcome for the inference consumer that is not typical (e.g., a price that is predicted by the model to increase tenfold).

At operation 328, a goal of a malicious party may be inferred based on the effect. The goal may be inferred by analyzing outcomes on various groups and/or the behaviors of groups or entities.

Analyzing the outcome on a group of entities related by some commonality may include identifying that a first subgroup of the related group of entities is disproportionately impacted (e.g., more negatively affected) by the effect of the poisoned inference than a second subgroup of the group of entities. The goal of a malicious party may be to harm the first subgroup based on the commonality. Further, it may be inferred that the malicious party may belong to the second subgroup.

The first subgroup of inference consumers may be participants in a market for a product, and the effect of the poisoned inference may be a change in price of the product used by the market participants. For example, the poisoned inference may predict a saturation of the product in the market, forcing the first subgroup to reduce the price of the product. The second subgroup may benefit financially from the reduction in price (e.g., the second subgroup may be a buyer of the product), while first subgroup may suffer due to low profits. This disproportionate effect on the two related subgroups may be analyzed to infer that the second group may be the malicious party with the goal of financial benefit.

Another method of inferring a goal of a malicious party is through analysis of the behaviors of a first party (e.g., inference consumer) of a first group that was disproportionately impacted (e.g., negatively impacted) by the poisoned inference when compared one or more parties belonging to a second group. The first party may modify an activity (e.g., change typical behavior) prior to the first group consuming the poisoned inference. If the behavior modification of the first party moves the first party to the second group (e.g., prevents the first party from being negatively impacted), then the first party may be identified as the malicious party with the goal of avoiding the negative outcome of the poisoned inference.

For example, consider a scenario in which a seller (e.g., a malicious party) of a product wishes to manipulate a market for a product through injection of poisoned training data. The poisoned training data may cause an inference model to generate inferences indicating that there is oversupply of the product in the market when, in fact, the market is undersupplied. Prior to injection of the poisoned inference into the market, the seller may sell the product into the market at a market price, thereby making a commensurate level of profit that matches market rates. However, after injecting the poisoned training data and ahead of a poisoned inference being released, the seller may greatly reduce the sale price of their product, greatly increasing sales while reducing per unit profit and greatly reducing sales by competing sellers.

Once the poisoned inference is released, other sellers may change their sale price (e.g., based on the inferred overabundance of the product in the market) to be much lower than the seller, resulting in curtailment of sales by the seller. The seller may then purchase products from the other sellers at the much lower price thereby restocking the seller's supply of the product. Once the poisoned inference is discovered, the price of the product in the market may rise well above the price that the seller paid for the resupplied stock thereby allowing the seller to further profit using the resupplied stock.

The method may end following operation 328.

The poisoned training dataset supplied by the malicious party and its effects (e.g., the tainted AI model and poisoned inferences) may be managed and/or remediated, at least in part, via the method illustrated in FIG. 3C. The effects of the poisoned training dataset may also be remediated via other methods.

Turning to FIG. 3C, a flow diagram illustrating a method of managing poisoned training data in accordance with an embodiment is shown. The method may be performed by a data processing system, and/or another device.

At operation 350, an identification may be made that a portion of a training dataset is poisoned. The identification may be made by (i) receiving the identification from another entity, (ii) reading the identification from storage, and/or (iv) making the identification. The identification may be made, for example, by performing various analysis of attributes of AI model instances, of training data and/or operation of entities from which the training data may be obtained.

At operation 352, the last known good instance of the AI model is identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model is obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference is identified. The poisoned inference may be a hard example and/or may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Figure 4:
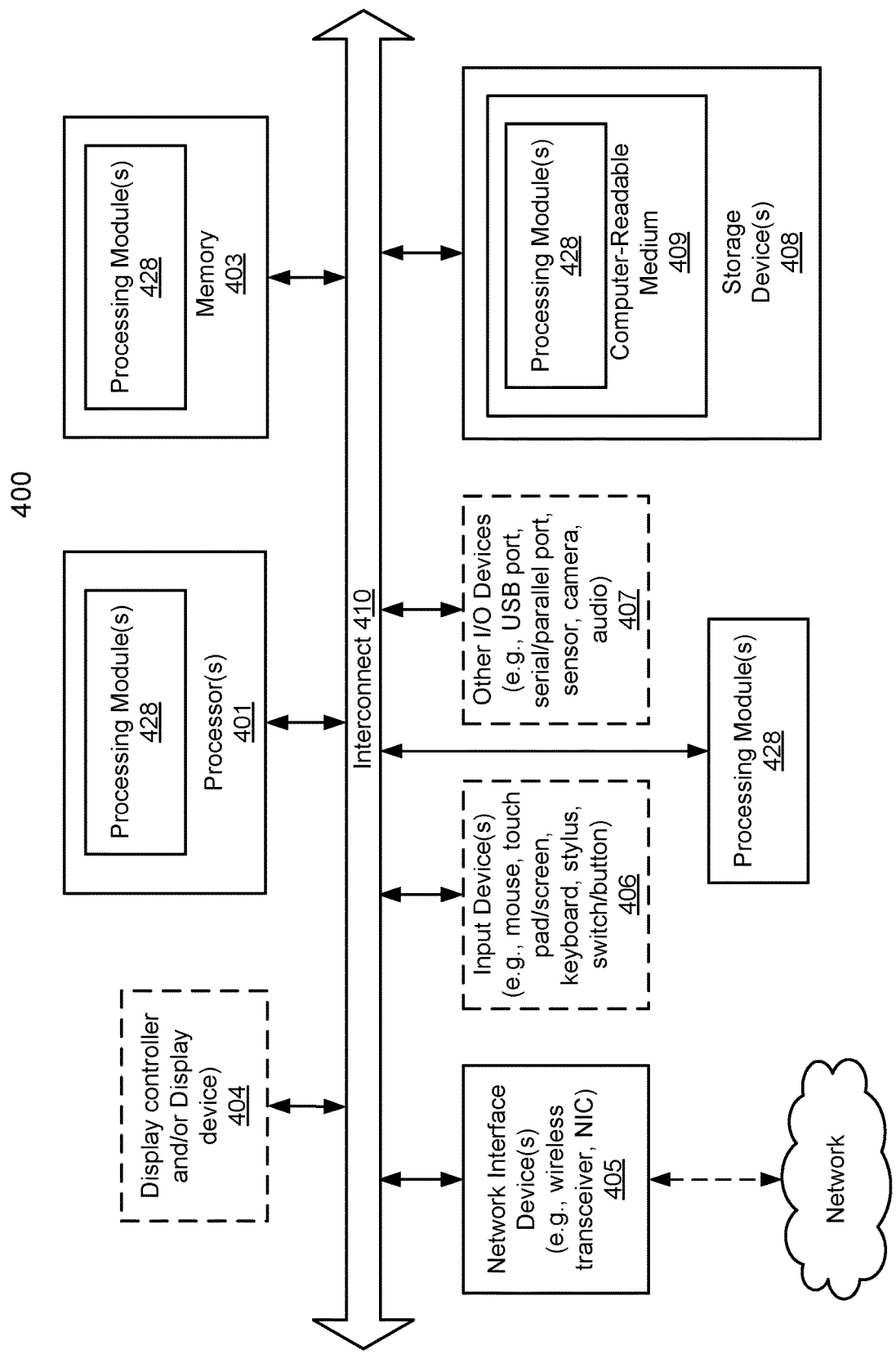
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an artificial intelligence (AI) model, comprising:
    making an identification that a training dataset is poisoned;
    identifying a tainted AI model instance that was obtained using the poisoned training dataset and the AI model;
    identifying a poisoned inference generated by the tainted AI model instance that has already been provided to an inference consumer;
    identifying an effect of the poisoned inference on the inference consumer that received the poisoned inference; and
    inferring, based on the effect, a goal of a malicious party by at least:
        identifying membership of the inference consumer in a first group of inference consumers disproportionately impacted by the effect when compared to an impact of the effect on a second group of inference consumers;
        identifying an inference consumer of the second group of inference consumers that modified an activity prior to use of the poisoned inference by the first group of inference consumers, the modification of the activity moving the inference consumer from the first group of inference consumers to the second group of inference consumers; and
        identifying the goal based on the inference consumer of the second group of inference consumers that modified the activity.

2. The method of claim 1, wherein inferring the goal of the malicious party further comprises:
    identifying a commonality among the first group of inference consumers; and
    identifying the goal further based on the commonality.

3. The method of claim 2, wherein the first group of inference consumers are participants in a market for a product, and the effect of the poisoned inference was a change in price of the product used by the participants.

4. The method of claim 1, wherein the activity is sale of a product at a first price, and the modified activity is sale of the product at a second price.

5. The method of claim 1, further comprising identifying a data source, the data source being used by the malicious party to provide the poisoned training dataset.

6. The method of claim 5, further comprising establishing a level of scrutiny for new training data being collected from the data source, the level of scrutiny being related to a level of impact of the poisoned inference.

7. The method of claim 5, further comprising eliminating the data source as a source for new training data collection.

8. The method of claim 1, wherein the effect of the poisoned inference on the inference consumer is identified based on a report of the effect, the report being received from the inference consumer to which the poisoned inference was provided.

9. The method of claim 1, wherein the tainted AI model instance is already deployed and providing inferences to inference consumers when the tainted AI model instance is identified using the poisoned training dataset and the AI model, the poisoned inference being one of the inferences and the inference consumer being one of the inference consumers.

10. A non-transitory machine-readable medium having instructions stored therein, which when executed by a processor, cause the processor to perform operations for managing an artificial intelligence (AI) model, the operations comprising:
   making an identification that a training dataset is poisoned;
   identifying a tainted AI model instance that was obtained using the poisoned training dataset and the AI model;
   identifying a poisoned inference generated by the tainted AI model instance that has already been provided to an inference consumer;
   identifying an effect of the poisoned inference on the inference consumer that received the poisoned inference; and
   inferring, based on the effect, a goal of a malicious party by at least:
      identifying membership of the inference consumer in a first group of inference consumers disproportionately impacted by the effect when compared to an impact of the effect on a second group of inference consumers;
      identifying an inference consumer of the second group of inference consumers that modified an activity prior to use of the poisoned inference by the first group of inference consumers, the modification of the activity moving the inference consumer from the first group of inference consumers to the second group of inference consumers; and
      identifying the goal based on the inference consumer of the second group of inference consumers that modified the activity.

11. The non-transitory machine-readable medium of claim 10, wherein inferring the goal of the malicious party further comprises:
   identifying a commonality among the first group of inference consumers; and
   identifying the goal further based on the commonality.

12. The non-transitory machine-readable medium of claim 11, wherein the first group of inference consumers are participants in a market for a product, and the effect of the poisoned inference was a change in price of the product used by the participants.

13. The non-transitory machine-readable medium of claim 10, wherein the activity is sale of a product at a first price, and the modified activity is sale of the product at a second price.

14. The non-transitory machine-readable medium of claim 10, wherein the operations further comprise identifying a data source, the data source being used by the malicious party to provide the poisoned training dataset.

15. A data processing system, comprising:
   a processor; and
   a memory coupled to the processor to store instructions, which when executed by the processor, cause the processor to perform operations for managing an artificial intelligence (AI) model, the operations comprising:
      making an identification that a training dataset is poisoned,
      identifying a tainted AI model instance that was obtained using the poisoned training dataset and the AI model,
      identifying a poisoned inference generated by the tainted AI model instance that has already been provided to an inference consumer;
      identifying an effect of the poisoned inference on the inference consumer that received the poisoned inference, and
      inferring, based on the effect, a goal of a malicious party by at least:
         identifying membership of the inference consumer in a first group of inference consumers disproportionately impacted by the effect when compared to an impact of the effect on a second group of inference consumers;
         identifying an inference consumer of the second group of inference consumers that modified an activity prior to use of the poisoned inference by the first group of inference consumers, the modification of the activity moving the inference consumer from the first group of inference consumers to the second group of inference consumers; and
         identifying the goal based on the inference consumer of the second group of inference consumers that modified the activity.

16. The data processing system of claim 15, wherein inferring the goal of the malicious party further comprises:
   identifying a commonality among the first group of inference consumers; and
   identifying the goal further based on the commonality.

17. The data processing system of claim 16, wherein the first group of inference consumers are participants in a market for a product, and the effect of the poisoned inference was a change in price of the product used by the participants.

18. The data processing system of claim 15, wherein the activity is sale of a product at a first price, and the modified activity is sale of the product at a second price.

19. The data processing system of claim 15, wherein the operations further comprise identifying a data source, the data source being used by the malicious party to provide the poisoned training dataset.

20. The data processing system of claim 15, wherein the tainted AI model instance is already deployed and providing inferences to inference consumers when the tainted AI model instance is identified using the poisoned training dataset and the AI model, the poisoned inference being one of the inferences and the inference consumer being one of the inference consumers.

* * * * *